Feb. 18, 1941.  H. BRYANT  2,231,882

FENCE GATE

Filed April 25, 1938  3 Sheets-Sheet 1

Inventor
Henry Bryant

Feb. 18, 1941.   H. BRYANT   2,231,882
FENCE GATE
Filed April 25, 1938   3 Sheets-Sheet 2

Inventor
Henry Bryant

Feb. 18, 1941.   H. BRYANT   2,231,882
FENCE GATE
Filed April 25, 1938   3 Sheets-Sheet 3
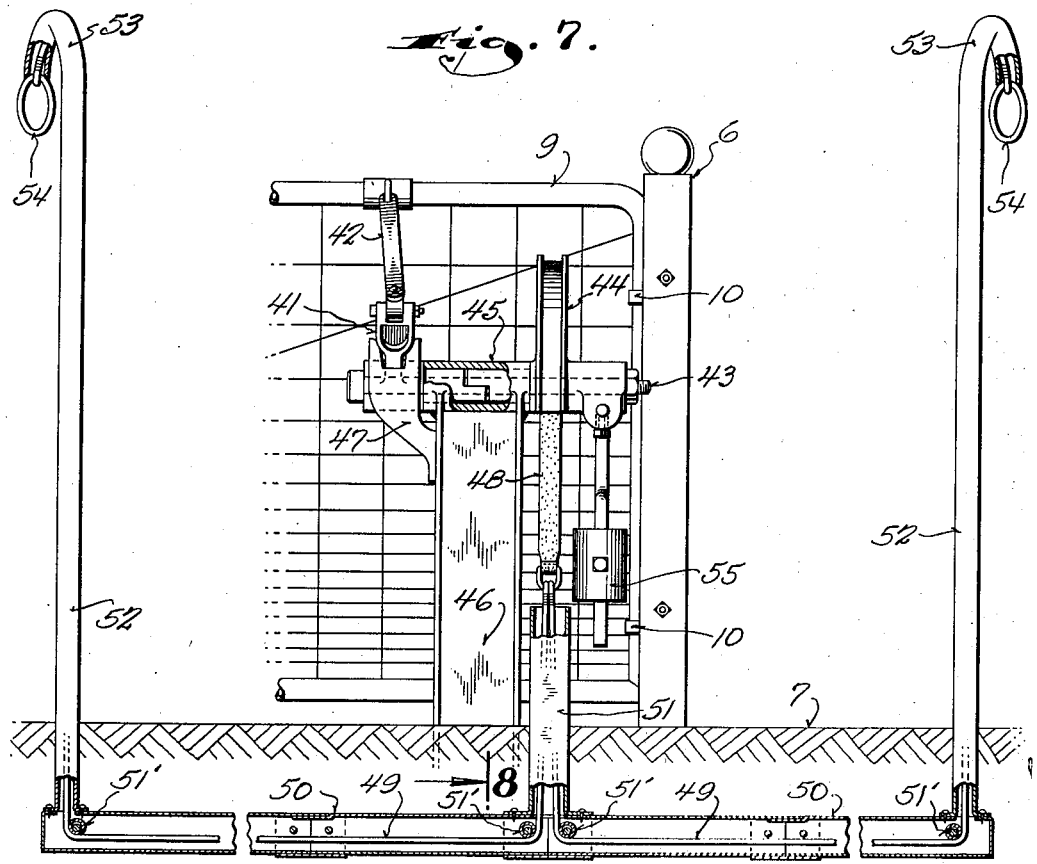
Fig. 7.
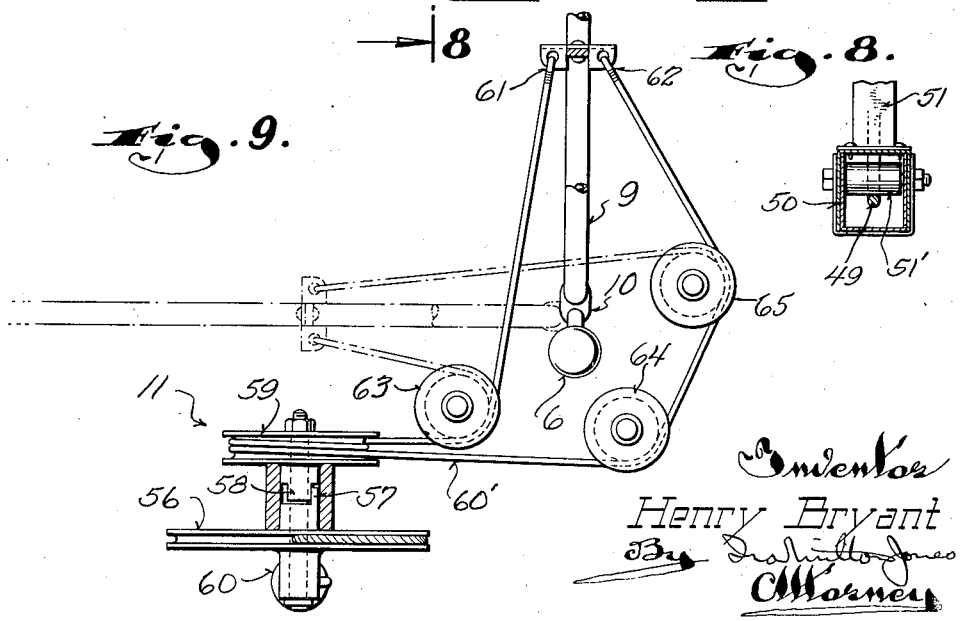
Fig. 8.
Fig. 9.
Inventor
Henry Bryant Patented Feb. 18, 1941

2,231,882

UNITED STATES PATENT OFFICE 2,231,882

FENCE GATE

Henry Bryant, Waukesha, Wis., assignor to Century Fence Company, Waukesha, Wis., a corporation of Wisconsin Application April 25, 1938, Serial No. 204,075

11 Claims. (Cl. 39—58)

This invention relates to fence gates and has as a general object to provide means for opening and closing a fence gate by the occupant of an automotive vehicle approaching the gate, without necessitating his leaving the vehicle.

While fence gates with such opening and closing means have been proposed in the past, few have been satisfactory for practical use primarily because of their complicated design and lack of sufficient strength.

It is therefore a special object of this invention to provide a gate opening and closing means of this type which is extremely simple in design and rugged in construction.

It is also an object of this invention to provide a gate opening and closing mechanism which is actuated to either open or close the gate by a pull exerted on a rope or cable accessible to an occupant of a vehicle approaching the gate from either direction.

Another object of this invention is to provide a gate opening and closing mechanism of the character described which is so designed that the actual opening and closing of the gate is effected by means of a weight or unbalanced member arranged to swing about a fixed axis, and which is rendered potentially active by a manual pull on a rope.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention, constructed in accordance with the best modes so far devised for the practical application of the principles thereof, and in which:

Figure 7 is a view similar to Figure 2, illustrating a modified embodiment of the invention, but showing the gate in its open position;

Figure 8 is a detail sectional view taken through Figure 7 on the plane of the line 8—8; and Figure 9 is a top view with parts broken away and in section, illustrating another modified embodiment of the invention.

Figure 1:
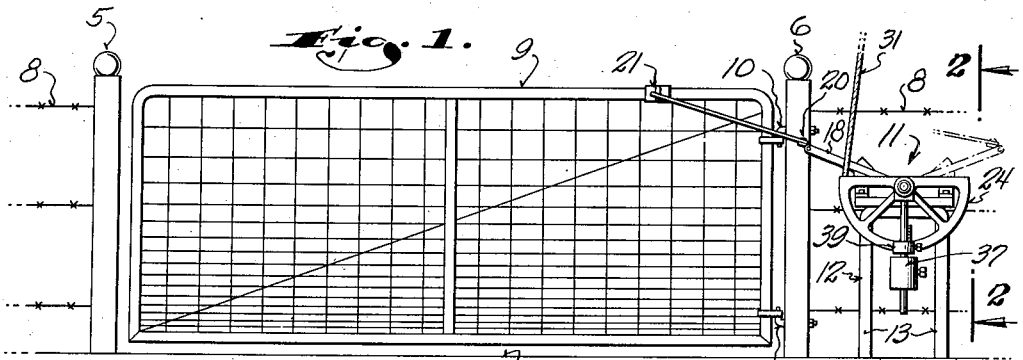
Figure 1 is a side view of a portion of a fence and a fence gate equipped with the opening and closing mechanism of this invention, the gate being shown in its closed position.
Figure 2:
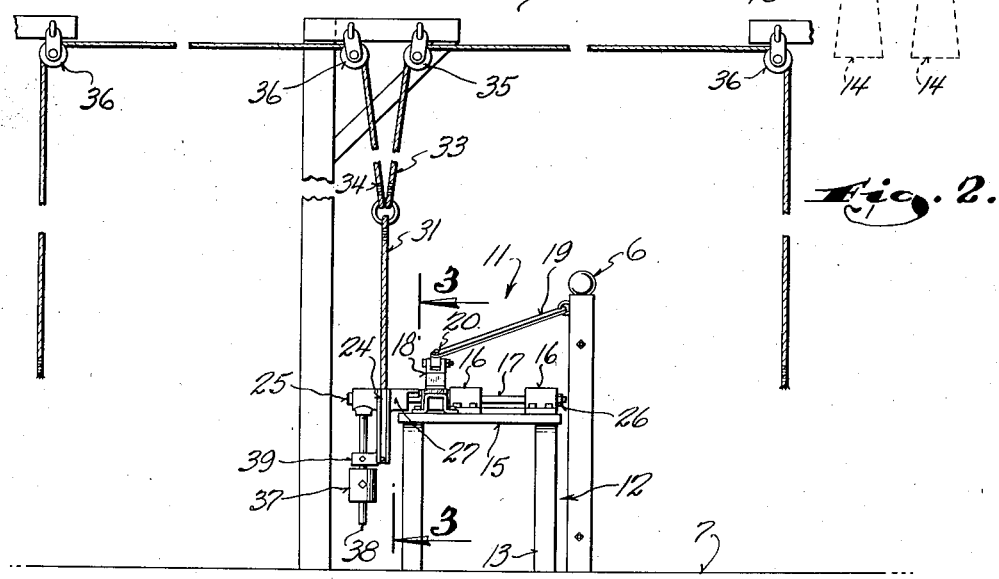
Figure 2 is an end view of the gate and its actuating mechanism taken substantially on the plane of the line 2—2 in Figure 1.

Referring now particularly to the accompanying drawings in which like numerals indicate like parts throughout the several views, the numerals 5 and 6 designate two spaced fence posts set on opposite sides of a driveway or roadway 7. Fence wires 8 are attached to these posts and a gate 9 is hingedly mounted from the post 6 by hinges 10 to swing from a closed position extending across the driveway or roadway to an open position paralleling the same. Mounted adjacent to the fence post 6 is a gate opening and closing mechanism, indicated generally by the numeral 11.

One embodiment of this gate opening and closing mechanism illustrated in Figures 1 to 6, inclusive, comprises a rigid support 12 anchored in the ground alongside the fence post 6. This support may be constructed in any suitable manner, and in the present instance comprises two substantially U-shaped channels 13 having their ends set in concrete 14 and having a bedplate or table 15 secured to their closed upper ends.

Mounted on the table or bedplate 15 are two aligned bearings 16 in which a shaft 17 is received. One end of this shaft projects beyond one of the bearings and has a lever 18 freely rotatably mounted thereon. The end of this lever is connected with the gate by means of a link 19. The connection 20 between the lever and one end of the link, and the connection 21 between the other end of the link and the gate, swivel to accommodate the relative motion between these parts as the gate is swung from one position to the other.

Figure 5:
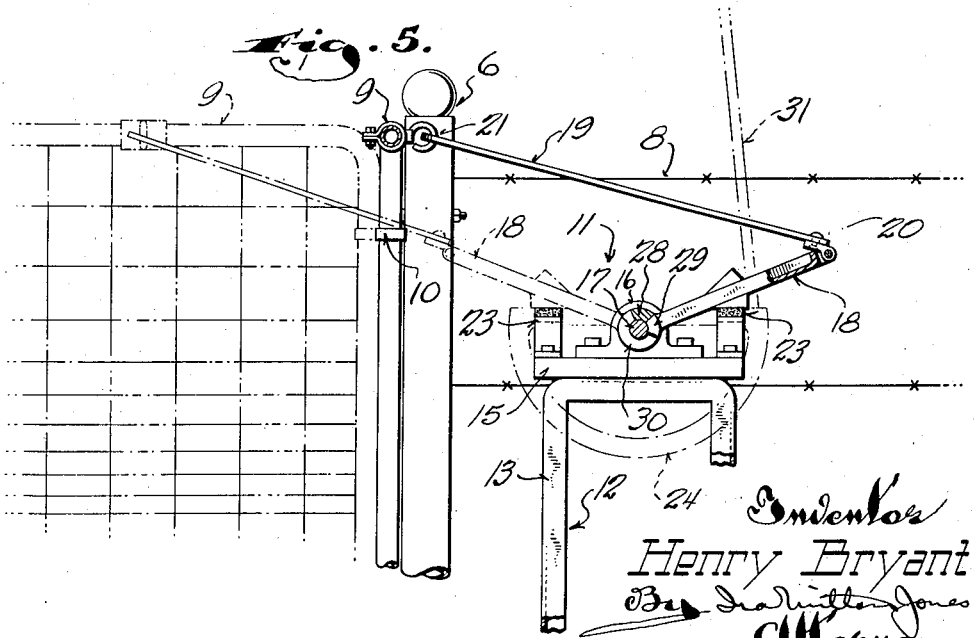
Figure 5 is a cross sectional view taken through Figure 4 on the plane of the line 5—5, but with the gate in its open position, and indicated in closed position in dotted lines.

The dimensions of the lever 18 and link 19 are such that when the lever 18 is swung about the shaft 17 through something less than one hundred and eighty degrees, as shown in Figures 1 and 5, the gate is moved between closed and open positions. The limits of movement of the lever 18 are defined by its engagement with cushioned stops 23 mounted on the table or bedplate 15 in line with the lever.

Gate actuating motion is imparted to the lever 18 by means of a wheel 24 freely rotatable on the end of the shaft 17 outwardly of the lever 18. To hold these parts assembled, one end of the shaft has a head 25 and its other end is threaded and has a nut 26 secured thereto. While the wheel 24 may be a complete wheel, only half thereof is required, and consequently, for the sake of lightness, only a half-wheel is employed.

The hub 27 of the wheel has a lug 28 on its end which faces the lever 18, and the lever 18 has a lug 29 extending from its hub 30 and lying in the path of the lug 28. Consequently, as the wheel 24 is rotated, its lug 28 contacts the lug 29 and swings the lever about the axis of the shaft 17. There is, however, considerable lost motion in the connection between the lugs 28 and 29 so that the wheel 24 can move through slightly more than one hundred and eighty degrees without having its lug 28 contact the lever carried lug 29.

Rotation is imparted to the wheel 24 by a pull on a rope 31, one end of which is secured to the wheel at the center of its circular periphery, as at 32, the rim of the wheel being grooved as a pulley to receive the rope. The opposite end of the rope extends upwardly and has two other ropes 33 and 34 connected thereto which run over pulleys 35 and 36, respectively, to have their outer end portions suspended at a distance from the gate and conveniently located to be grasped by an occupant of a vehicle approaching the gate.

Attached to the wheel is a weight 37. The attachment of the weight to the wheel comprises a rod 38 having its inner end threaded in a boss on the hub of the wheel and having its medial portion passing through a lug 39 on the rim of the wheel, the weight being adjustably secured on the outer projecting end of the rod by means of a set screw 40.

It is to be observed that the weight is mounted on a plane which bisects the wheel and is in line with the point of attachment of the rope to the wheel. Consequently, the normal dependent position of the weight holds the wheel in its full line position shown in Figures 1 and 3, with the rope 31 wrapped about ninety degrees of the wheel on either side of its center, depending upon whether the gate is open or closed.

Figures 3, 6:
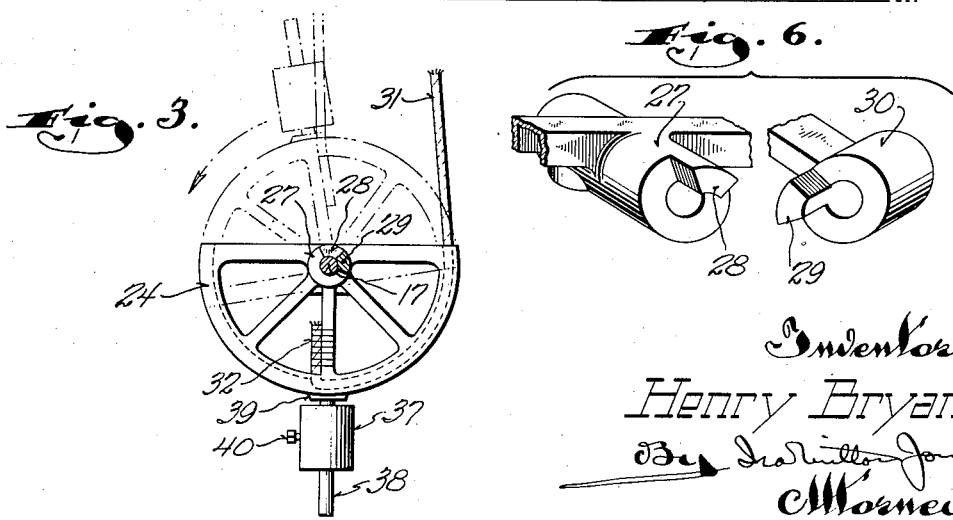
Figure 3 is a cross sectional view taken through Figure 2 on the plane of the line 3—3
Figure 6 is a perspective view illustrating one of the details of the actuating mechanism.
Figure 4:
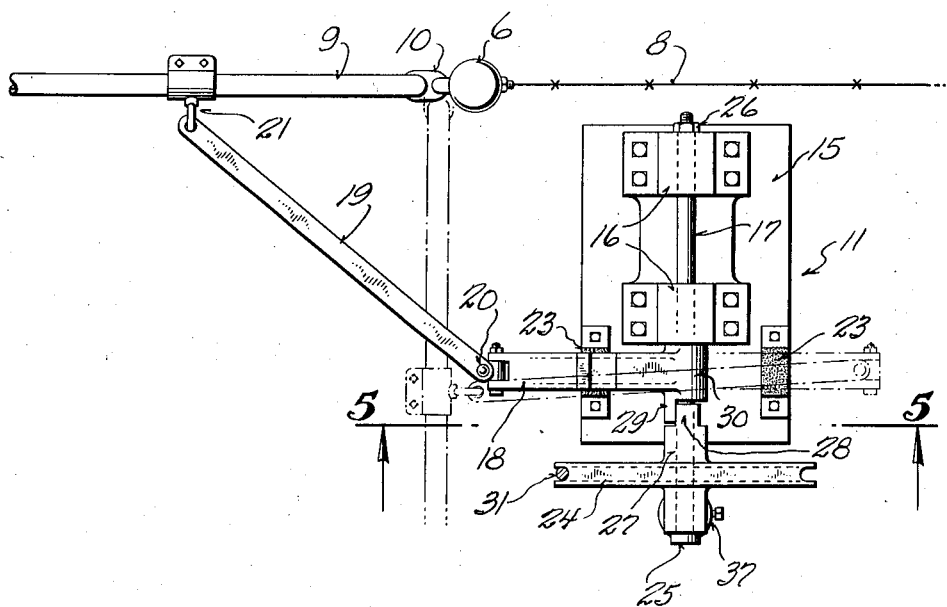
Figure 4 is a top plan view of the gate and the actuating mechanism, showing the gate in closed position and indicating its open position in dotted lines.

An upward pull applied to the rope 31 thus turns the wheel either in a clockwise or counterclockwise direction, again depending upon which side of the wheel the rope is wound about to lift the weight 37, as indicated in dotted lines in Figure 3.

As long as the rope is pulled with ordinary rapidity, the inertia of the weight as it swings upwardly carries the wheel past dead center, and after the weight has passed dead center, the wheel carried lug 28 engages the lug 29 so that the weight in continuing its swing about the shaft axis carries the lever from its then position to its opposite position to either open or close the gate. After this operation, the parts again assume their normal positions, but with the rope on the other side of the wheel so that the next successive pull on the rope returns the gate to the position from which it had just been moved.

A modified embodiment of the invention is illustrated in Figure 7. In this construction, the lever 41 which is connected with the gate through a link 42 is swung from one position to the other in substantially the same manner, but the construction of the mounting for the actuating mechanism is simplified, and instead of overhead ropes, the actuating lines are carried underground.

As in the embodiment previously described, the lever 41 is mounted on a shaft 43 which passes through the hub of the lever and the hub of the wheel 44, both hubs having their adjacent end portions which carry the driving lugs freely rotatable in a bearing 45 fixed to the upper end of a pedestal 46. In this manner the lost motion connection afforded by the driving lugs is completely housed and protected against the elements.

The stops which define the limits of movement for the lever 41 are in the form of brackets 47 bolted or otherwise secured to the pedestal.

Instead of the rope around the pulley or wheel, a band 48 is provided; the free end of which extends downwardly to be connected to two cables 49 which rise up from underground ducts 50 through a tube 51. The ducts 50, as best shown in Figure 8, are preferably formed of two interengaging channels built up of short sections and at the points at which the cables change direction, pulleys 51' are provided. These pulleys may be in the form of spools or sleeves threaded on through bolts which also serve to hold the channel sections together.

As clearly shown in Figure 7, the underground ducts extend in opposite directions from the fence along the side of the roadway, and at their outer ends have tubular risers 52 connected thereto through which the cables pass.

The upper ends of these risers are curved, as at 53, to overhang the roadway and the adjacent ends of the cables are preferably equipped with rings or other handles 54 which facilitate the application of a pull on the cables, and also hold the same against being pulled back down into the tubular risers.

As in the embodiment previously described, a pull on either one of these cables rotates the wheel to carry the weight 55 upwardly and past dead center so that in returning to its dependent position, the weight actuates the lever 41 to either open or close the gate.

Another modified embodiment of the invention is illustrated in Figure 9. In this instance, the pull exerted on the operating cable or rope turns a wheel 56 and after taking up lost motion between driving lugs 57 and 58 carried respectively by the hub of the wheel 56 and a drum 59 imparts rotation to the drum 59 under the influence of a weight 60.

Rotation of the drum 59 is translated into opening or closing motion of the gate by means of a cable 60' having its opposite ends 61 and 62 connected to the gate at different levels to accommodate the diameter of the drum 59 and connected at a medial point to the drum 59.

That end portion of the cable having the end 61 is trained over a pulley 63 mounted to turn on a vertical axis and in a plane substantially horizontally tangent to the bottom of the drum 59. The other end of the cable passes over pulleys 64 and 65 mounted to turn on vertical axes in a horizontal plane substantially tangent to the top of the drum.

From the foregoing description taken in connection with the accompanying drawings, it will be readily apparent to those skilled in the art that this invention provides an exceedingly simple manner of opening and closing a fence gate without necessitating an occupant of a vehicle leaving the same; and that the actuating mechanism is simple in design and sturdy in construction.

What I claim as my invention is:

1. In combination with a gate mounted to swing between closed and open positions: means for opening and closing the gate comprising a weight mounted to swing about a substantially horizontal axis and normally hanging downwardly from its support; means operable from a point remote from the gate for swinging the weight about its support to an elevated potentially active position from which it continues to move in the same direction back to its normal pendent position; and means operable by the motion of the weight during its return by gravity to its normal pendent position for translating the motion thus produced into opening or closing motion of the gate depending upon the direction of motion of the weight, said means including a rigid link having one end pivotally connected to the gate.

2. In combination with a gate mounted to swing between closed and open positions: means for actuating the gate comprising, a rigid support adjacent to the gate and having a substantially horizontal bearing; a member supported from said bearing to turn on its horizontal axis; means biasing said member to a predetermined normal position; means operable from a point remote from the gate for rotating said member about the horizontal axis of the supporting bearing against the tendency of its biasing means to hold it in said normal position, to a point from which the biasing means continues the rotation of said member back to its normal position; an actuating member rotatably supported from said bearing and connected with the gate to swing the gate upon movement of the actuating member; and a lost motion driving connection between said biased member and the actuating member for transmitting the motion of the biased member under influence of its biasing means to the actuating member.

3. In combination with a gate mounted to swing between closed and open positions: means for actuating the gate comprising, a rigid support adjacent to the gate and having a substantially horizontal bearing; a member supported from said bearing to turn on its horizontal axis; means biasing said member to a predetermined normal position; manually operable means for rotating said member about the horizontal axis of the supporting bearing against the tendency of its biasing means to hold it in said normal position, to a point from which the biasing means continues the rotation of said member back to its normal position; an actuating member rotatably supported from said bearing and connected with the gate to swing the gate upon movement of the actuating member; a lost motion driving connection between said biased member and the actuating member for transmitting the motion of the biased member under influence of its biasing means to the actuating member; and means on the biased member engageable with the manually operable means for shifting the position of said manually operable means from one side to the other of the horizontal bearing during movement of the biased member under influence of the biasing means so that a subsequent manual operation of the manually operable means effects an opposite rotation of the biased member.

4. In combination with a gate mounted to swing between closed and open positions: means for actuating the gate comprising, a fixed support; an unbalanced member rotatably mounted on said support and held by gravity in a predetermined inactive position; a manually operable tension member connected with the unbalanced member at a point which lies substantially on a vertical plane passing through the axis of rotation of the unbalanced member when said unbalanced member is in said predetermined position and extending to one side or the other of its support so that a pull exerted thereon turns the unbalanced member in one direction or the other to carry the same to a potentially active position from which gravity continues its rotation back to its predetermined inactive position and disposes the tension member at the opposite side of its support; and linkage means connected with the gate and having a lost motion connection with the unbalanced member for translating the motion of the unbalanced member produced by gravity into swinging movement of the gate in a direction depending upon the direction of rotation of the unbalanced member.

5. In combination with a gate mounted to swing between closed and open positions: means for actuating the gate comprising, a fixed support adjacent to the hinged end of the gate; a pulley mounted from the fixed support to rotate on a substantially horizontal axis, said pulley being weighted so as to assume a predetermined normal inactive position when free; a tension member connected with the pulley at a point which lies substantially on a vertical plane passing through the axis of rotation of the pulley when the pulley is in its normal position and extending around the periphery of the pulley for substantially ninety degrees at one side or the other of its axis so that a pull exerted on the tension member turns the pulley in one direction or the other depending upon which side of the axis of rotation the tension member is on to rotate the pulley to a potentially active position from which gravity continues its rotation back to its normal inactive position; and linkage means connected with the gate and having a lost motion connection with the pulley for translating the motion of the pulley produced by gravity into swinging movement of the gate in one direction or the other depending upon the direction of rotation of the pulley.

6. In combination with a gate mounted to swing between closed and open positions: means for actuating the gate comprising, a fixed support adjacent to the hinged end of the gate; a pulley mounted from the fixed support to rotate on a substantially horizontal axis, said pulley being weighted so as to assume a predetermined normal position when free; a tension member connected with the pulley at a point which lies substantially on a vertical plane passing through the axis of rotation of the pulley when the pulley is in its normal position and extending around the periphery of the pulley for substantially ninety degrees at one side or the other of its axis so that a pull exerted on the tension member turns the pulley in one direction or the other depending upon which side of the axis of rotation the tension member is on to rotate the pulley to a potentially active position from which gravity continues its rotation back to its normal position; an actuating member mounted from the fixed support to turn about the same axis about which the pulley rotates; cooperating means carried by said actuating member and the pulley establishing a lost motion connection therebetween whereby gravity produced motion of the pulley alone is transmitted to the actuating member; and a connection between the actuating member and the gate.

7. In combination with a gate mounted to swing between closed and open positions: a fixed support adjacent to the hinged end of the gate and including a horizontally disposed bearing; a pulley rotatably supported by the bearing; a weight carried by the pulley for normally holding the same in a predetermined position; a tension member connected with the pulley at a point which lies substantially on the vertical plane passing through its axis of rotation and having a part thereof wrapped about substantially ninety degrees of the pulley at one side or the other of its axis so that a pull exerted on the tension member turns the pulley in one direction or the other to raise its weight to a potentially active position from which gravitational force acting on the weight continues the rotation of the pulley back to its predetermined normal position and shifts the relative position of the tension member to the opposite side of the pulley axis so that a subsequent pull on the tension member turns the pulley in the opposite direction; an actuating member mounted to swing about the axis of the bearing; cooperating means carried by the actuating member and the pulley forming a lost motion connection therebetween which is active only during the gravity propelled motion of the pulley for transmitting such motion of the pulley to the actuating member; and a connection between the actuating member and the gate for swinging the gate as the actuating member is moved.

8. In combination with a gate mounted to swing between closed and open positions: a fixed support adjacent to the hinged end of the gate and including a horizontally disposed bearing; a pulley rotatably supported by the bearing; a weight carried by the pulley for normally holding the same in a predetermined position; a tension member connected with the pulley at a point which lies substantially on the vertical plane passing through its axis of rotation and having a part thereof wrapped about substantially ninety degrees of the pulley at one side or the other of its axis so that a pull exerted on the tension member turns the pulley in one direction or the other to raise its weight to a potentially active position from which gravitational force acting on the weight continues the rotation of the pulley back to its predetermined normal position and shifts the relative position of the tension member to the opposite side of the pulley axis so that a subsequent pull on the tension member turns the pulley in the opposite direction; an actuating member mounted to swing about the axis of the bearing; cooperating means carried by the actuating member and the pulley forming a lost motion connection therebetween which is active only during the gravity propelled motion of the pulley for transmitting such motion of the pulley to the actuating member; a connection between the actuating member and the gate for swinging the gate as the actuating member is moved; and manually operable means located at opposite sides of the gate and remote therefrom for imparting a pull on the tension member.

9. In combination with a gate mounted to swing between closed and open positions: means for actuating the gate comprising, a fixed support adjacent to the hinged end of the gate; a substantially horizontal bearing on the fixed support; a lever carried by the bearing to swing about the axis of the bearing; means for limiting the swinging motion of the lever; a connection between the lever and the gate whereby swinging motion of the lever opens and closes the gate; a member rotatably supported by the bearing; a weight connected with said member for holding the same in a normal predetermined position; means operable at points remote from the gate for rotating said member to carry its weight to an elevated potentially active position from which gravitational force acting on the weight continues the rotation of the member back to its normal predetermined position; and a lost motion connection between said rotatable member and the lever allowing movement of the rotatable member produced manually to carry the weight to its potentially active position without affecting the position of the lever and for directly driving the lever during the completion of the rotation of the rotatable member in response to gravitational force acting on the weight.

10. In combination with a gate mounted to swing between closed and open positions: a fixed support adjacent to the hinged end of the gate; a drum mounted from said support to turn on a substantially horizontal axis; a cable having its opposite ends attached to the gate and having its medial portion wound about the drum; pulleys over which the cable passes so arranged with respect to the hinged mounting of the gate that as rotation of the drum winds up the cable in one direction or the other the gate is swung between closed and open positions; a rotatable member mounted to turn about a fixed axis, said rotatable member being unbalanced and being held by gravity in a normal predetermined position; manually operable means for rotating said member to a potentially active position from which gravity continues its rotation back to its normal predetermined position; and a lost motion connection between the rotatable member and the drum through which rotation of said rotatable member is transmitted to the drum only during its gravity produced motion.

11. In combination with a gate hingedly mounted to swing between closed and open positions: means for actuating the gate comprising, a fixed support adjacent to the hinged end of the gate; a bearing carried by said support; an actuating member having a part rotatable in said bearing and arranged to swing between two defined limits of motion; a connection between said actuating member and the gate whereby swinging motion of the actuating member opens and closes the gate; an unbalanced member having a part rotatable in said bearing and normally maintaining a predetermined inactive position; manually operable means for rotating said unbalanced member to a potentially active position from which gravitational force acting thereon continues its rotation back to its predetermined position; and cooperating means carried by those portions of the actuating member and the unbalanced member within the bearing for establishing a lost motion connection between said members wholly within the bearing and operable to transmit gravity produced motion of the unbalanced member to the actuating member.

HENRY BRYANT.